United States Patent
Duelk

(10) Patent No.: US 7,426,349 B2
(45) Date of Patent: Sep. 16, 2008

(54) METHOD OF SIGNAL TRANSMISSION IN A WDM COMMUNICATION SYSTEM

(75) Inventor: Marcus Duelk, Atlantic Highlands, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 724 days.

(21) Appl. No.: 10/777,942

(22) Filed: Feb. 12, 2004

(65) Prior Publication Data

US 2005/0180762 A1    Aug. 18, 2005

(51) Int. Cl.
  H04B 10/04     (2006.01)
  H04B 10/12     (2006.01)
  G02F 1/01       (2006.01)

(52) U.S. Cl. ................... 398/185; 398/183; 398/186; 359/276

(58) Field of Classification Search .............. 398/185, 398/183, 186; 359/276
See application file for complete search history.

(56) References Cited

U.S. PATENT DOCUMENTS

| | | | | |
|---|---|---|---|---|
| 5,867,534 A | * | 2/1999 | Price et al. | 375/286 |
| 6,671,079 B2 | * | 12/2003 | Fuller et al. | 359/264 |
| 6,741,761 B2 | * | 5/2004 | Sharp | 385/2 |
| 2002/0063928 A1 | * | 5/2002 | Hansen et al. | 359/130 |
| 2003/0030882 A1 | | 2/2003 | Garrett et al. | 359/246 |
| 2003/0175036 A1 | | 9/2003 | Mamyshev et al. | 398/188 |
| 2004/0208429 A1 | * | 10/2004 | Gill et al. | 385/24 |
| 2004/0253000 A1 | * | 12/2004 | Grifin | 398/183 |

FOREIGN PATENT DOCUMENTS

WO    WO 02/09325 A1    1/2002

* cited by examiner

*Primary Examiner*—Shi K. Li
*Assistant Examiner*—Nathan M Curs

(57) ABSTRACT

In a representative embodiment, a transmitter of a WDM communication system is equipped with a Mach-Zehnder modulator (MZM) configured to produce an optical signal corresponding to a duobinary data stream by modulating a beam of light passing through the MZM. A three-level electrical signal is applied to the MZM to modulate the light. At the second signal level, the modulator substantially blocks light transmission. At the first and third levels, the modulator transmits light corresponding to the duobinary "−1" and "+1" bits, respectively, such that a relative phase shift between the optical bits is different than 180 degrees, i.e., the phase shift value employed in prior-art optical duobinary modulation. Advantageously, by appropriately selecting voltages for the first and third levels, the relative phase shift between the optical bits can be adjusted to reduce detrimental effects of optical bandpass filtering typically present in the WDM communication system, thereby reducing the number of decoding errors at the receiver.

20 Claims, 6 Drawing Sheets

METHOD OF SIGNAL TRANSMISSION IN A WDM COMMUNICATION SYSTEM

BACKGROUND OF THE INVENTION

1. Field of the Invention

The present invention relates to optical communication equipment and, more specifically, to equipment for WDM communication systems.

2. Description of the Related Art

To achieve high transmission capacity, wavelength-division multiplexing (WDM) communication systems should have relatively high spectral efficiency. For example, to achieve a capacity of 1.2 Tbit/s, a WDM system operating over a wavelength range of about 25 nm (3.1 THz) should have a spectral efficiency of about 0.4 bit/s/Hz. This corresponds to a channel spacing of about 0.8 nm (100 GHz) for a bit rate of 40 Gbit/s. With WDM channel packing this dense, narrow bandpass filtering should be employed to provide good channel isolation/crosstalk reduction. However, this filtering also results in optical waveform distortion, which increases the number of decoding errors at the receiver. It is therefore desirable to have a method of signal transmission that would mitigate the effects of narrow bandpass filtering in dense WDM communication systems.

SUMMARY OF THE INVENTION

Problems in the prior art are addressed, in accordance with the principles of the present invention, by a method of signal transmission in a WDM communication system, according to which an optical transmitter is overdriven to produce a favorable phase shift between different optical bits. In a representative embodiment, a transmitter of a WDM communication system is equipped with a Mach-Zehnder modulator (MZM) configured to produce an optical signal corresponding to a duobinary data stream by modulating a beam of light passing through the MZM. A three-level electrical signal is applied to the MZM to modulate the light. At the second signal level, the modulator substantially blocks light transmission. At the first and third levels, the modulator transmits light corresponding to the duobinary "−1" and "+1" bits, respectively, such that a relative phase shift between the optical bits is different than 180 degrees, i.e., the phase shift value employed in prior-art optical duobinary modulation. Advantageously, by appropriately selecting voltages for the first and third levels, the relative phase shift between the optical bits can be adjusted to reduce detrimental effects of optical bandpass filtering typically present in the WDM communication system, thereby reducing the number of decoding errors at the receiver.

According to one embodiment, the present invention is a method of signal transmission in a communication system, comprising: (A) transmitting an optical beam through a modulator adapted to: (1) have a peak of light transmission at a first voltage; (2) substantially block light transmission at a second voltage greater than the first voltage; and (3) have another peak of light transmission at a third voltage greater than the second voltage; and (B) driving the modulator with an electrical signal having two or more levels, wherein: (i) a first level is outside of a voltage range between the first and third voltages; and (ii) a second level is either inside the voltage range between the first and third voltages or outside of said voltage range on the opposite side from the first level.

According to another embodiment, the present invention is a transmitter for a communication system, comprising: (A) a modulator configured to transmit light generated by a light source, wherein the modulator is adapted to: (1) have a peak of light transmission at a first voltage; (2) substantially block light transmission at a second voltage greater than the first voltage; and (3) have another peak of light transmission at a third voltage greater than the second voltage; and (B) a driver configured to drive the modulator with an electrical signal having two or more levels, wherein: (i) a first level is outside of a voltage range between the first and third voltages; and (ii) a second level is either inside the voltage range between the first and third voltages or outside of said voltage range on the opposite side from the first level.

According to yet another embodiment, the present invention is a communication system, comprising an optical transmitter and an optical receiver coupled via a communication link, wherein: (i) the optical transmitter comprises: a modulator adapted to modulate an optical beam with data; and a driver adapted to drive the modulator with an electrical signal corresponding to the data; (ii) the communication link subjects the modulated beam to bandpass filtering; and (iii) the modulator is overdriven to introduce a phase shift between optical symbols in the modulated beam such that, at the receiver, inter-symbol interference caused by the bandpass filtering is reduced.

BRIEF DESCRIPTION OF THE DRAWINGS

Other aspects, features, and benefits of the present invention will become more fully apparent from the following detailed description, the appended claims, and the accompanying drawings in which:

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 1:
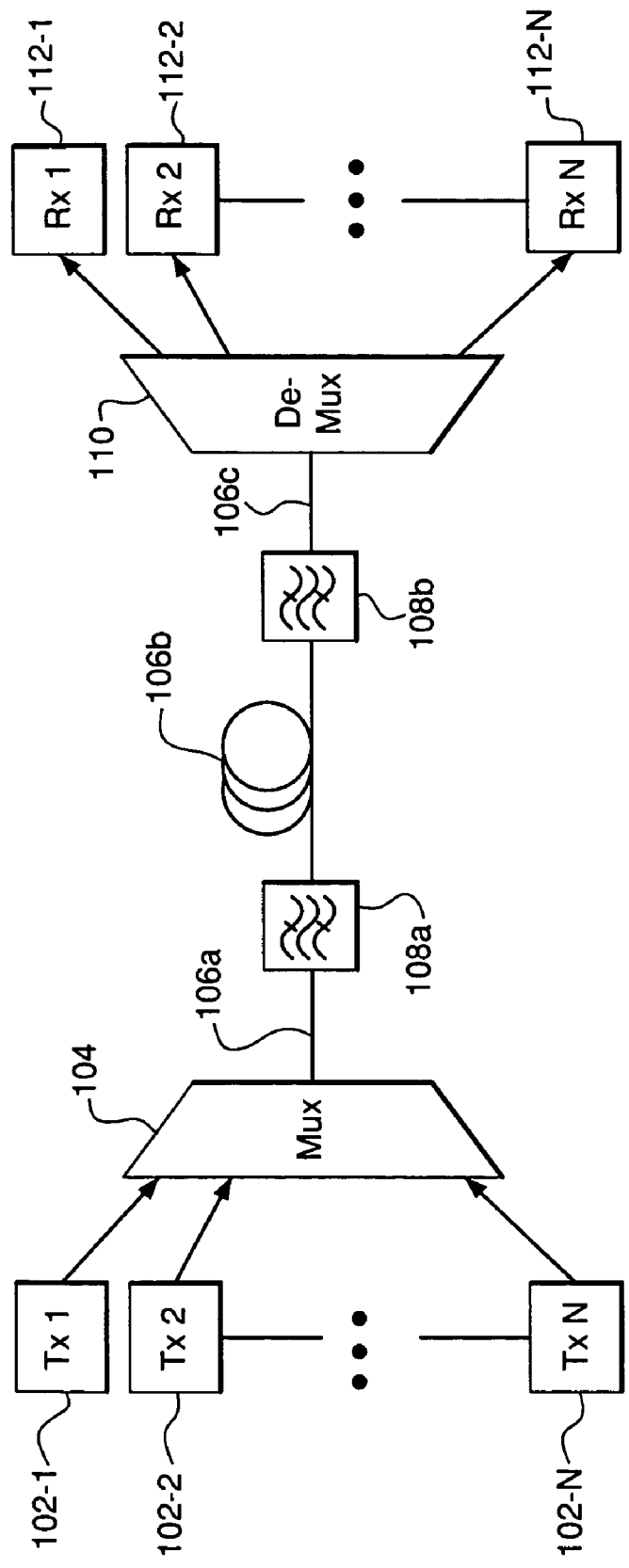
FIG. 1 shows a representative WDM communication system, in which the present invention may be practiced.

FIG. 1 shows a representative WDM communication system 100 in which the present invention may be practiced. System 100 has N optical transmitters 102-$i$ (where i=1, 2, . . . N), each sending an optical signal corresponding to a WDM channel and operating at a designated wavelength. An optical multiplexer (MUX) 104 combines the outputs of transmitters 102-$i$ into a multiplexed optical signal, which is then transmitted to optical de-multiplexer (De-MUX) 110 through spans of optical fiber 106 and optical bandpass filters 108 interposed between the optical multiplexer and de-multiplexer. Optical de-multiplexer 110 decomposes the received multiplexed signal into its individual wavelength components, each of which is then applied to and processed by a corresponding optical receiver 112-i. In one implementation, WDM channel spacing in system 100 is less than about 1 nm and filters 108 are configured to provide bandpass characteristics appropriate for that channel spacing.

Figure 2:
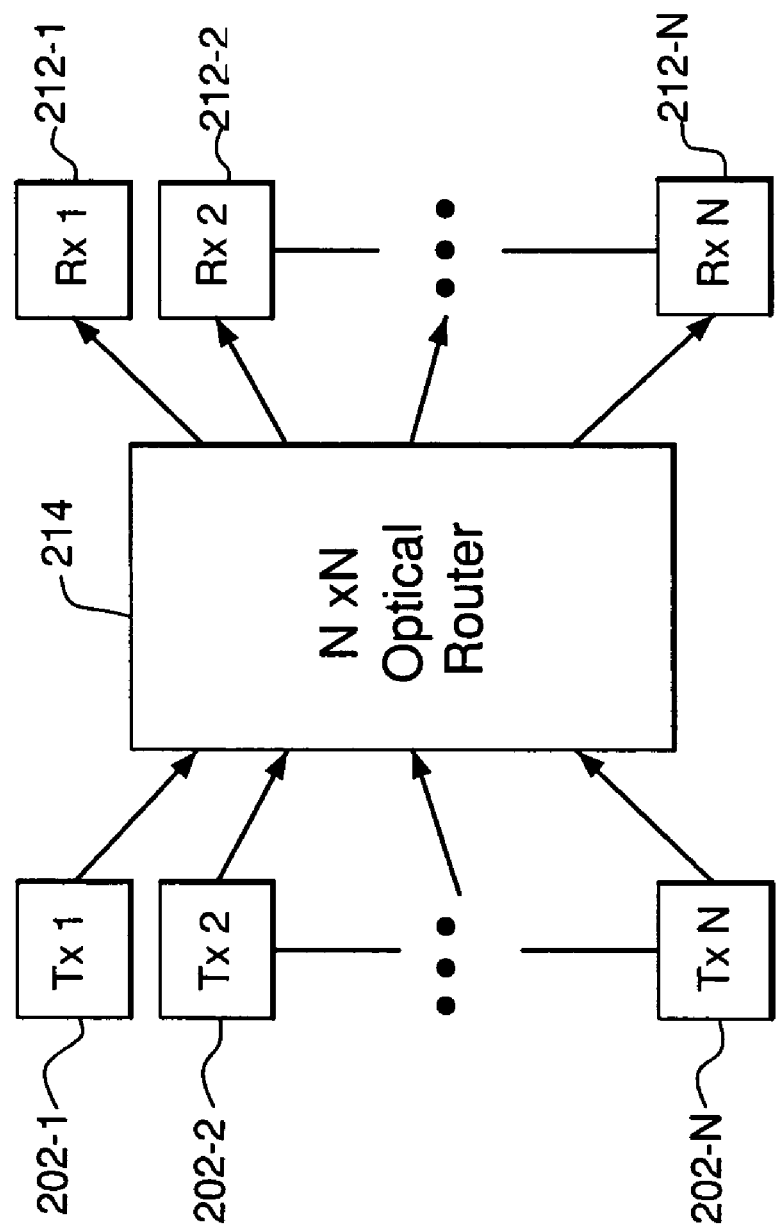
FIG. 2 shows another representative WDM communication system, in which the present invention may be practiced.

FIG. 2 shows another representative WDM communication system 200 in which the present invention may be practiced. System 200 has N optical transmitters 202-i and N optical receivers 212-i (where i=1, 2, ... N) coupled through an N×N optical router 214. Transmitters 202 and receivers 212 are similar to transmitters 102 and receivers 112, respectively, of system 100. In one embodiment, router 214 is an optical switch fabric, e.g., an arrayed waveguide grating (AWG) designed to route optical signals based on wavelength. It can be appreciated by one skilled in the art that, for high channel density, e.g., 0.8 bit/s/Hz, router 214 may subject optical signals to narrow bandpass filtering similar to that in system 100.

Figure 3:
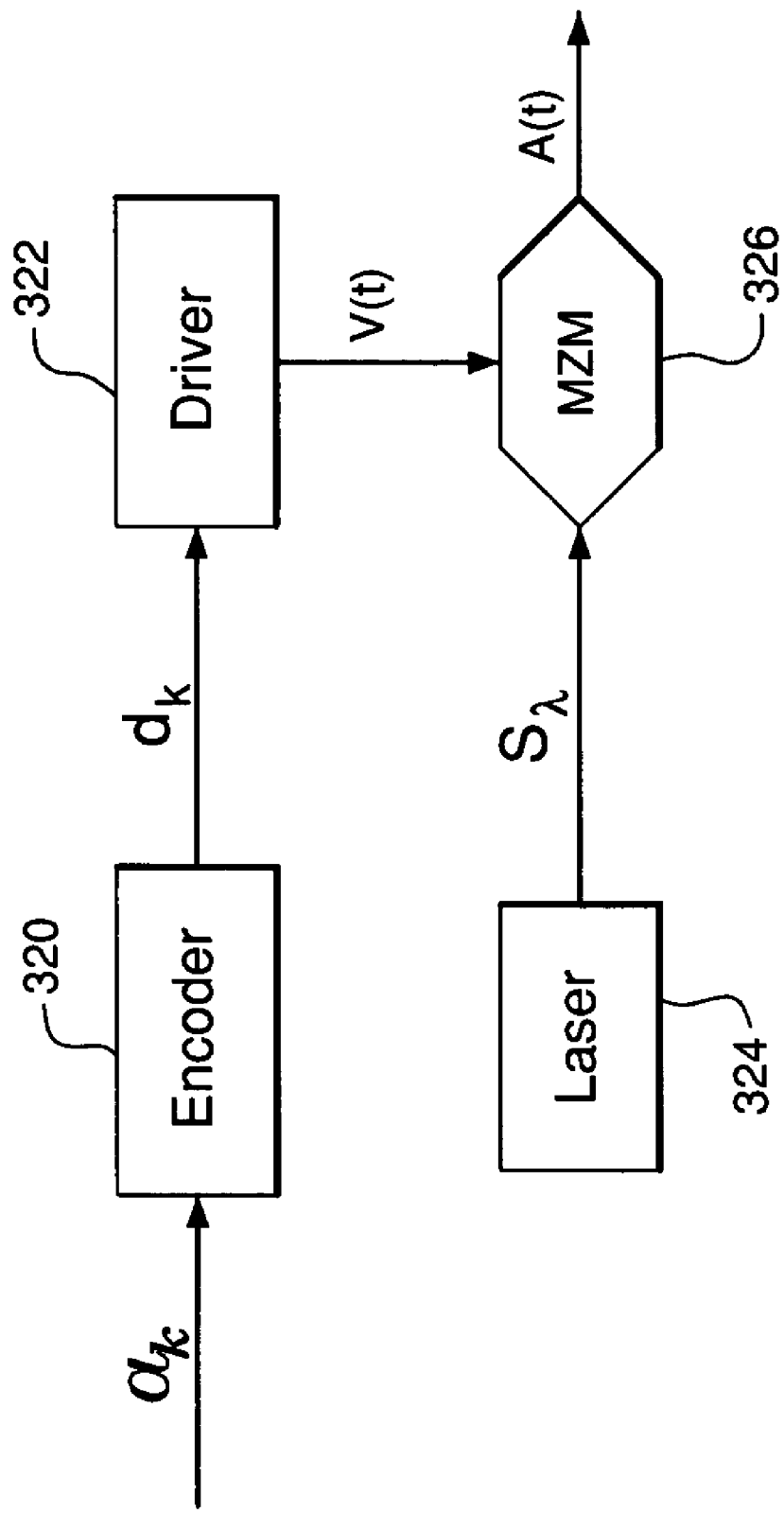
FIG. 3 shows a block diagram of an optical transmitter that can be used in the WDM communication systems of FIGS. 1 and 2.

FIG. 3 shows a block diagram of an optical transmitter 302 that can be used as optical transmitter 102 or 202. Transmitter 302 receives a binary data sequence, $a_k$, e.g., a pseudo-random bit stream (PRBS), and generates a corresponding modulated optical signal, A(t), which can then be applied to either multiplexer 104 (FIG. 1) or router 214 (FIG. 2). An encoder 320 converts sequence $a_k$ into a corresponding encoded sequence, $d_k$. Encoder 320 may also introduce inter-symbol correlation (ISC) data into sequence $a_k$, as known in the art, to reduce error propagation at the receiver end of the WDM communication system. Based on sequence $d_k$, a driver 322 generates a drive signal V(t) applied to a Mach-Zehnder modulator (MZM) 326. Using the drive signal, MZM 326 modulates a carrier signal ($S_\lambda$) generated by a laser 324, thereby producing signal A(t). It should be noted that encoder 320 may be excluded from transmitter 302, when a binary transmission format is used and driver 322 is configured to operate based on a binary data sequence. In this situation, sequence $a_k$ may be applied directly to driver 322. However, when a multilevel (i.e., using three or more levels) data transmission format is used, encoder 320 is deployed to convert binary sequence $a_k$ into a corresponding multilevel sequence $d_k$.

Figure 4:
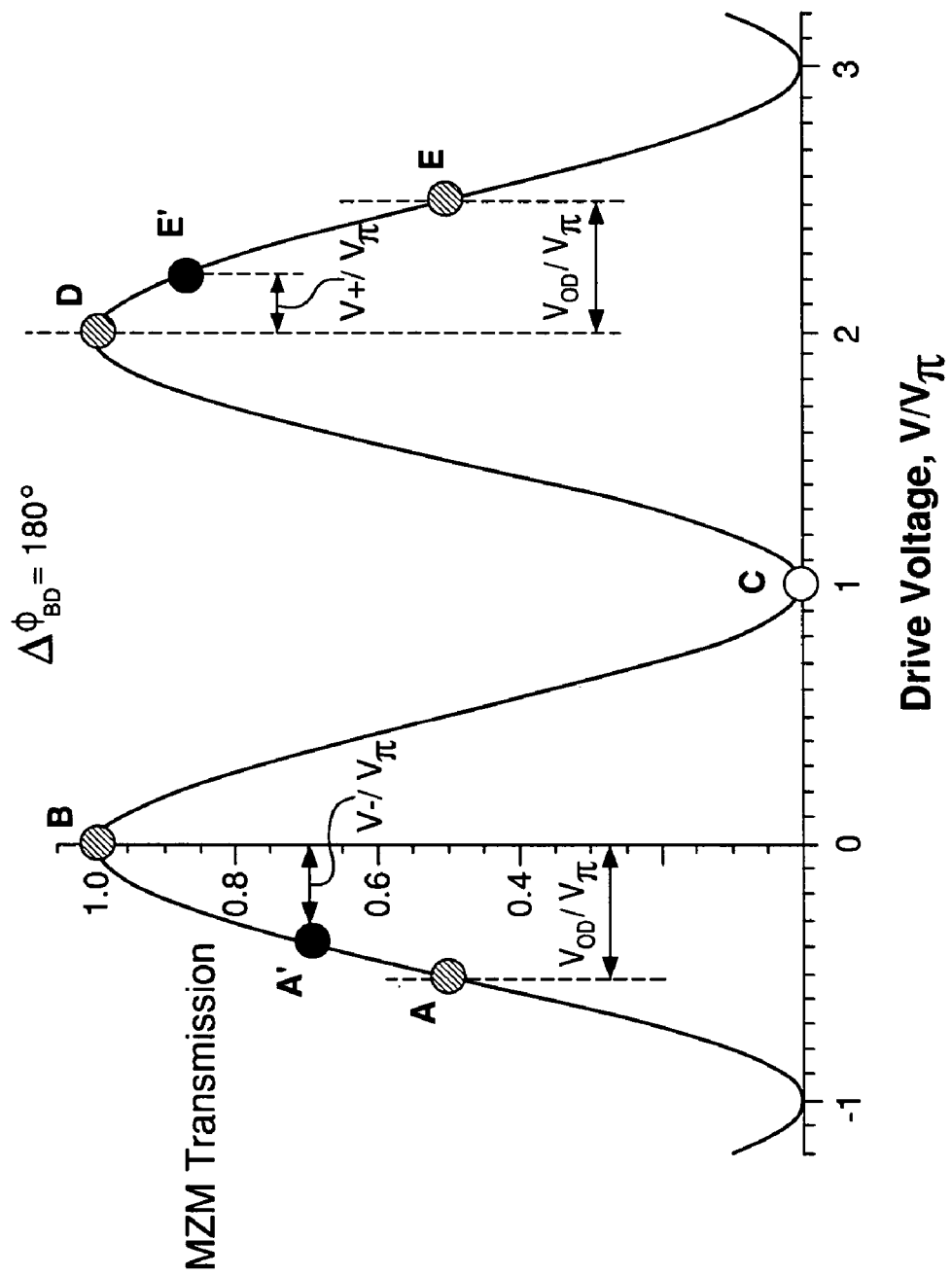
FIG. 4 graphically illustrates operation of a Mach-Zehnder modulator (MZM) used in the optical transmitter of FIG. 3 according to certain embodiments of the present invention.

FIG. 4 graphically illustrates operational principles of MZM 326. More specifically, FIG. 4 shows the intensity of the output signal produced by MZM 326 as a function of drive voltage applied to the MZM. MZM 326 modulates signal $S_\lambda$ by splitting it into two portions, introducing a phase shift ($\phi_{12}$) between them, and recombining the portions at the output. The value of $\phi_{12}$ is determined by the value of drive voltage (V) that can conveniently be measured in units of $V_\pi$, i.e., the drive voltage value corresponding to $\phi_{12}$=180 degrees. In operation, when V=$V_\pi$ (point C in FIG. 4), the two portions interfere destructively at the output of MZM 326, which results in substantially no light being output by the MZM. In contrast, when V=0 or 2 $V_\pi$ (points B and D, respectively, in FIG. 4), the two portions interfere constructively at the output of MZM 326, which results in maximum light intensity being transmitted through the MZM. As can further be seen in FIG. 4, drive voltage values that are not integer multiples of $V_\pi$ result in intermediate light intensities. The phase ($\Phi$) of the output signal produced by MZM 326 is also determined by the value of the drive voltage. For example, the relative phase shift ($\Delta\Phi_{BD}$) between optical signals corresponding to points B and D is 180 degrees.

In prior-art modulation methods, MZM 326 is driven such that the intensity contrast between "high" and "low" states of signal A(t) is at a maximum. For example, data modulation in a standard on-off keying format is achieved by using a binary sequence $d_k$ and driving MZM 326 with electrical signal V(t) having two levels so as to induce transitions either between points B and C (inverting mode) or between points C and D (non-inverting mode). Similarly, for duobinary signaling, data modulation is achieved by using a duobinary sequence $d_k$ and driving MZM 326 with electrical signal V(t) having three levels so as to induce transitions between points B and D via point C. One skilled in the art can appreciate that other modulation formats may also be implemented using MZM 326. A method of signal transmission according to one embodiment of the present invention will now be described in the context of duobinary modulation. However, one skilled in the art will readily understand that, in other embodiments, other modulation formats may similarly be employed.

Optical duobinary modulation is disclosed in detail, for example, in U.S. Pat. No. 5,867,534, the teachings of which are incorporated herein by reference. Briefly, duobinary signaling uses three signal levels designated, for example, "+1", "0", and "−1". Furthermore, a duobinary sequence has no transitions between the "+1" and "−1" levels in successive time slots. Only transitions between (i) "0" and "+1" and (ii) "0" and "−1" levels can occur. A waveform corresponding to one of the duobinary levels (i.e., a duobinary symbol) is transmitted during each signaling interval. For example, for the "0" bit, substantially no light is transmitted. The "+1" and "−1" bits are transmitted as light having +E and −E electric fields, respectively, where opposite polarities of the electric field correspond to a relative optical phase shift ($\Delta\Phi$) of 180 degrees. While an optical beam modulated in this manner is a three-level signal in terms of the electric field, it is a two-level signal in terms of the optical power. Based on this property of duobinary signals, a conventional "binary" receiver is typically employed to receive duobinary signals. Since both "+1" and "−1" duobinary states correspond to light "on", a binary receiver converts optical duobinary signals into corresponding electrical binary signals by simply measuring optical power.

As already indicated above, prior-art duobinary modulation is implemented, e.g., by configuring driver 322 to generate drive voltages as follows: (1) when $d_k$=0, V(t)=$V_\pi$ (point C in FIG. 4); (2) when $d_k$=−1, V(t)=0 (point B in FIG. 4); and (3) when $d_k$=+1, V(t)=2 $V_\pi$ (point D in FIG. 4). In this configuration, the intensity contrast of signal A(t) is at a maximum and the relative optical phase shift between the "+1" and "−1" optical bits is about 180 degrees.

In accordance with one embodiment of the present invention, driver 322 is configured to overdrive the prior-art duobinary voltages by a value of $V_{OD}$ as indicated in FIG. 4. More specifically, driver 322 is configured to generate drive voltages as follows: (1) when $d_k$=0, V(t)=$V_\pi$ (point C in FIG. 4); (2) when $d_k$=−1, V(t)=−$V_{OD}$ (point A in FIG. 4); and (3) when $d_k$=+1, V(t)=2 $V_\pi$+$V_{OD}$ (point E in FIG. 4). In this new configuration, the intensity contrast of signal A(t) is no longer at a maximum and the relative optical phase shift between the "+1" and "−1" optical bits is different from (i.e., greater or less than) 180 degrees. In one representative configuration, the intensity contrast of signal A(t) is reduced by about 5% from the maximum contrast and/or the relative optical phase shift between the "+1" and "−1" optical bits is about 175 degrees.

Points A and E in FIG. 4 represent a "balanced" overdrive mode, i.e., when the positive and negative overdrive voltages have equal amplitudes. Alternatively, driver 322 may be configured to generate drive voltages in an "imbalance" mode, for example, as follows: (1) when $d_k$=0, V(t)=$V_\pi$ (point C in FIG. 4); (2) when $d_k=-1$, $V(t)=-V_-$ (point A' in FIG. 4); and (3) when $d_k=+1$, $V(t)=2 V_\pi+V_+$ (point E' in FIG. 4). In this configuration, the positive and negative overdrive voltages ($V_-$ and $V_+$) may have different amplitudes.

In another possible configuration, driver 322 may be configured to generate drive voltages such that, for one duobinary symbol, the corresponding prior-art voltage is overdriven, while for the other duobinary symbol, the corresponding prior-art voltage is used without any overdriving. For example, the following voltage combination may be used: (1) when $d_k=0$, $V(t)=V_\pi$ (point C in FIG. 4); (2) when $d_k=-1$, $V(t)=-V_-$ (point A' in FIG. 4); and (3) when $d_k=+1$, $V(t)=2V_\pi$ (point D in FIG. 4). In yet another configuration, driver 322 may be configured to generate drive voltages such that, for one duobinary symbol, the corresponding prior-art voltage is overdriven, while, for the other duobinary symbol, the corresponding prior-art voltage is under-driven. One example of this configuration is as follows: (1) when $d_k=0$, $V(t)=V_\pi$; (2) when $d_k=-1$, $V(t)=-V_-$; and (3) when $d_k=+1$, $V(t)=1.9V_\pi$.

Although it may seem counterintuitive that a method of signal transmission employing a reduced intensity contrast compared to that employed in a prior-art method can improve transmission characteristics of a dense WDM communication system, it will be shown below that this is indeed the case. One reason for the improvement is that narrow bandpass filtering present in the WDM communication system (see, e.g., FIG. 1) induces signal distortions of the type that causes errors at the receiver primarily due to inter-symbol interference (ISI). The above-described overdriving technique produces a favorable phase relationship between the interfering symbols so as to reduce the detrimental effects of ISI. Overall performance improvement at the receiver is achieved despite some loss in the intensity contrast at the transmitter output because the improvement due to the ISI reduction is greater than the relatively small degradation caused by the loss of amplitude. Advantageously, depending on the bandpass properties of the system, the value(s) of $V_{OD}$ or $V_-/V_+$ can be adjusted to attain optimum system performance.

Figure 5B:
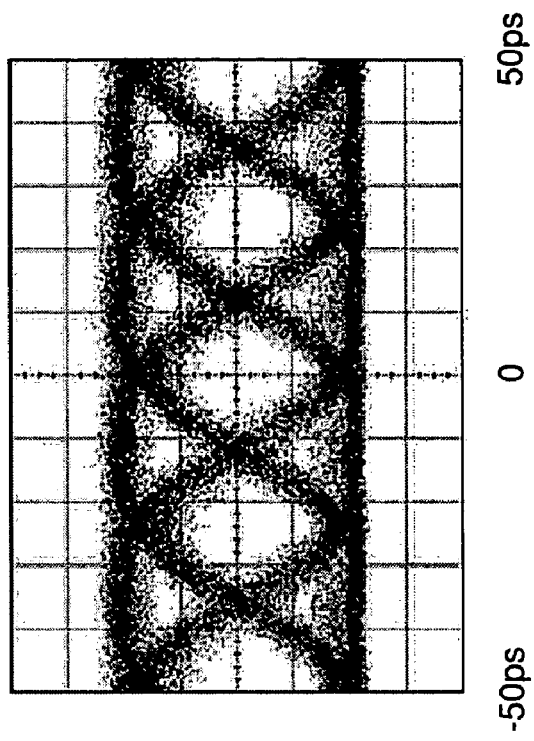
FIGS. 5A-B graphically show performance of the system shown in FIG. 1, when it is operated to transmit duobinary optical signals according to a prior-art method and one embodiment of the present invention, respectively.
Figure 5A:
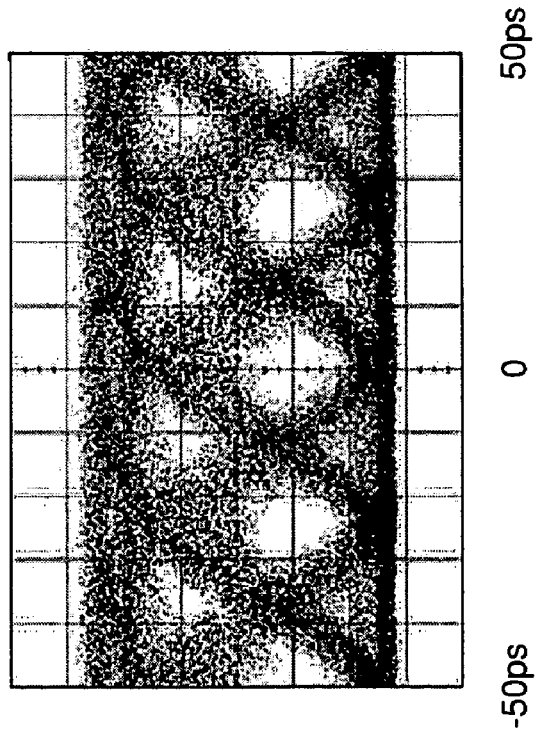

FIGS. 5A-B graphically show performance of system 100, when the system is operated to transmit duobinary optical signals according to the prior-art method and one embodiment of the present invention, respectively. More specifically, FIGS. 5A-B show eye diagrams of an optical 40-Gbit/s duobinary signal received by receiver 112-$i$, when the transmitter is analogous to transmitter 302 shown in FIG. 3 and combined transmission characteristics of filters 108 are equivalent to those of a Gaussian bandpass filter having a 3 dB bandwidth of 25 GHz. FIG. 5A is an eye diagram of the received signal, when MZM 326 of transmitter 302 is driven with a total drive voltage sweep of $2V_\pi$ between points B and D via point C as shown in FIG. 4. Similarly, FIG. 5B is an eye diagram of the received signal when MZM 326 of transmitter 302 is driven with a total drive voltage sweep of $2.8V_\pi$ ($V_{OD}=0.4 V_\pi$) between points A and E via point C as further shown in FIG. 4. As can be seen, the eye diagram of FIG. 5A exhibits significant eye closure due to the detrimental effects of narrow bandpass filtering in filters 108. Compared to FIG. 5A, the eye diagram of FIG. 5B demonstrates significant eye improvement (i.e., opening) advantageously produced by the use of the overdriving technique.

Figure 6:
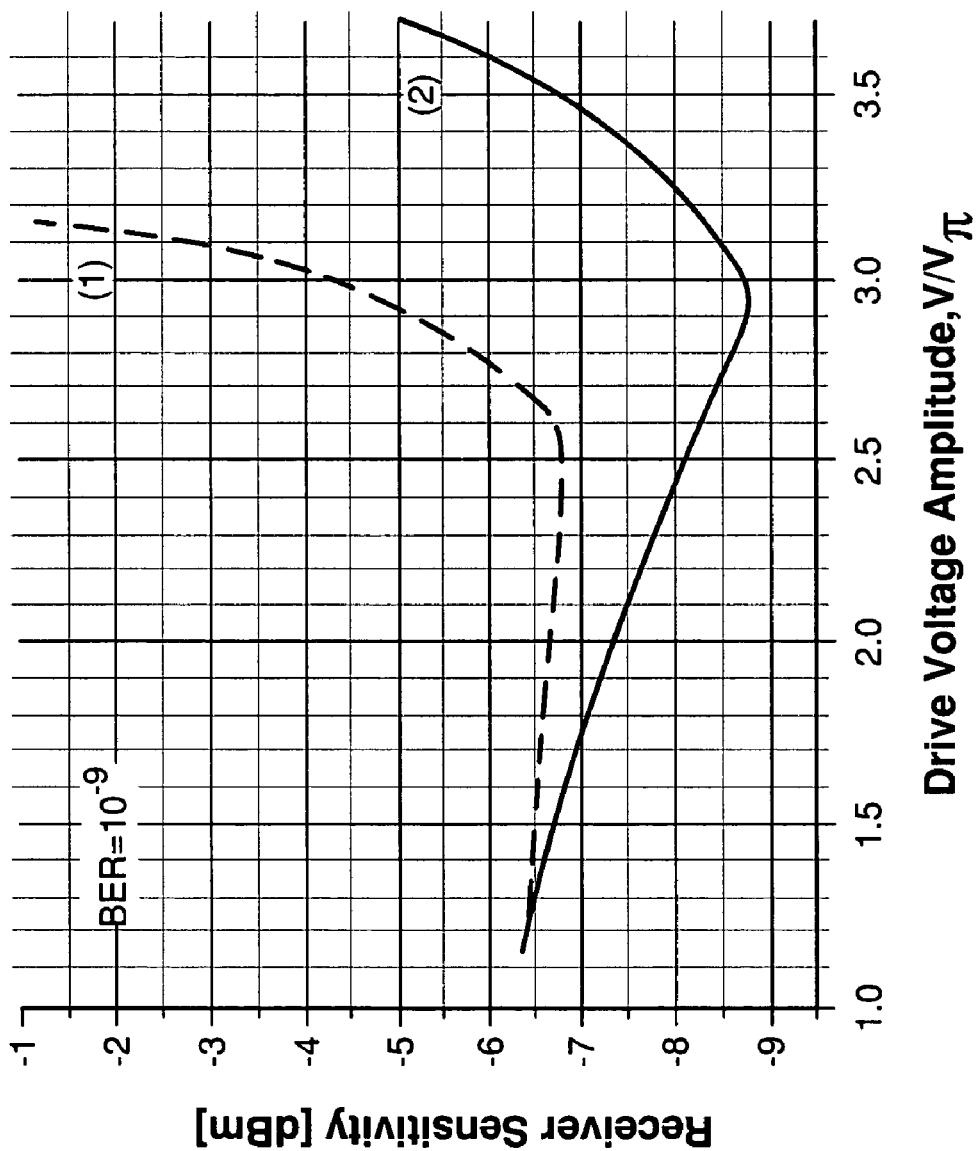
FIG. 6 graphically demonstrates improvements in receiver sensitivity resulting from the use of one embodiment of the present invention.

FIG. 6 graphically shows improvement in receiver sensitivity resulting from the use of one embodiment of the present invention. More specifically, FIG. 6 shows receiver sensitivity corresponding to a bit error rate (BER) of $10^{-9}$ as a function of drive voltage sweep applied to MZM 326 of transmitter 302. The dashed curve corresponds to a 40-Gbit/s duobinary signal generated by transmitter 302 and sampled right at the transmitter output, without passing through a transmission line. The solid curve corresponds to the same duobinary signal, but sampled at the receiver end of a WDM communication system having optical bandpass filtering characteristics analogous to those of a Gaussian bandpass filter with a 25-GHz full-width at half-maximum. As can be seen in FIG. 6, in the absence of bandpass filtering, an increase of the drive voltage sweep up to about $2.6 V_\pi$ leaves the receiver sensitivity substantially unchanged, after which point the receiver sensitivity begins to deteriorate sharply. In contrast, when bandpass filtering is present in the system, an increase of the drive voltage sweep from $2 V_\pi$ to about $2.9 V_\pi$ decreases (i.e., improves) the value of receiver sensitivity by about 1.5 dB. The data of FIG. 6 also indicate that, for this particular system, best results are achieved by overdriving the MZM by about 0.5 to 1.25 $V_\pi$ (i.e., about 25 to 63%). Although not shown in FIG. 6, an additional improvement of about 0.3 dB can be achieved using the above-described imbalance mode.

While this invention has been described with reference to illustrative embodiments, this description is not intended to be construed in a limiting sense. Various modifications of the described embodiments, as well as other embodiments of the invention, which are apparent to persons skilled in the art to which the invention pertains are deemed to lie within the principle and scope of the invention as expressed in the following claims.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

What is claimed is:

1. A method of signal transmission in a communication system, comprising:
   transmitting an optical beam through a modulator adapted to:
      have a peak of light transmission at a first voltage;
      substantially block light transmission at a second voltage greater than the first voltage; and
      have another peak of light transmission at a third voltage greater than the second voltage;
   driving the modulator with an electrical signal having three or more levels, wherein:
      a first level is outside of a voltage range between the first and third voltages, said voltage range including the first and third voltages;
      a second level is either inside the voltage range between the first and third voltages or outside of said voltage range on the opposite side from the first level; and
      a third level is inside said voltage range; and
   generating the electrical signal based on a data stream, wherein each signal level corresponds to a different data value.

2. The method of claim 1, wherein the second level corresponds to the second voltage.

3. The method of claim 1, wherein light transmission corresponding to the first level is lower than a peak light transmission.

4. The method of claim 1, wherein:
   the second level is inside the voltage range between the first and third voltages and is different from any one of the first, second, and third voltages.

5. The method of claim 1, wherein the electrical signal is generated based on a duobinary data sequence and each of the first, second, and third levels corresponds to a different duobinary data value.

6. The method of claim 1, wherein:
the first level is less than the first voltage; and
the second level is greater than the third voltage.

7. The method of claim 6, wherein the voltage difference between the first voltage and the first level is different from the voltage difference between the third voltage and the second level.

8. The method of claim 1, wherein a relative optical phase shift for the transmitted optical beam corresponding to the first and second levels is different than about 180 degrees.

9. The method of claim 1, wherein the first level is selected based on desired receiver sensitivity at a selected bit error rate.

10. The method of claim 1, wherein the first level is selected based on an eye diagram at a receiver of the communication system.

11. The method of claim 1, wherein the modulator is a Mach-Zehnder modulator and the communication system is a wavelength division multiplexing (WDM) communication system.

12. The method of claim 1, wherein the difference between the first level and the first voltage exceeds 10% of the difference between the first and third voltages.

13. A transmitter for a communication system, comprising:
a modulator configured to transmit light generated by a light source, wherein the modulator is adapted to:
have a peak of light transmission at a first voltage;
substantially block light transmission at a second voltage greater than the first voltage; and
have another peak of light transmission at a third voltage greater than the second voltage;
a driver configured to drive the modulator with an electrical signal having three or more levels, wherein:
a first level is outside of a voltage range between the first and third voltages, said voltage range including the first and third voltages;
a second level is either inside the voltage range between the first and third voltages or outside of said voltage range on the opposite side from the first level; and
a third level is inside said voltage range and
an encoder configured to convert an incoming data stream into an encoded data sequence, wherein the driver generates the electrical signal based on the encoded data sequence such that each signal level corresponds to a different data value of said sequence.

14. The transmitter of claim 13, further comprising the light source.

15. The transmitter of claim 13, wherein the encoded data sequence is a duobinary data sequence.

16. A communication system comprising a transmitter, wherein the transmitter includes:
a modulator configured to transmit light generated by a light source, wherein the modulator is adapted to:
have a peak of light transmission at a first voltage;
substantially block light transmission at a second voltage greater than the first voltage; and
have another peak of light transmission at a third voltage greater than the second voltage;
a driver configured to drive the modulator with an electrical signal having three or more levels, wherein:
a first level is outside of a voltage range between the first and third voltages, said voltage range including the first and third voltages;
a second level is either inside the voltage range between the first and third voltages or outside of said voltage range on the opposite side from the first level; and
a third level is inside said voltage range and
an encoder configured to convert an incoming data stream into an encoded data sequence, wherein the driver generates the electrical signal based on the encoded data sequence such that each signal level corresponds to a different data value of said sequence.

17. The communication system of claim 16, further comprising a receiver configured to receive optical signals from the transmitter via a communication link, said link including a link element that is adapted to subject optical signals passing there through to bandpass filtering.

18. The communication system of claim 17, wherein the link element is an optical router and the communication system has multiple instances of the transmitter.

19. A method of signal transmission in a communication system, comprising:
transmitting an optical beam through a modulator adapted to:
have a peak of light transmission at a first voltage;
substantially block light transmission at a second voltage greater than the first voltage; and
have another peak of light transmission at a third voltage greater than the second voltage; and
driving the modulator with an electrical signal having three or more levels, wherein:
a first level is outside of a voltage range between the first and third voltages;
a second level is inside the voltage range between the first and third voltages;
a third level is outside of the voltage range between the first and third voltages;
the first level is less than the first voltage;
the third level is greater than the third voltage; and
the voltage difference between the first voltage and the first level is different from the voltage difference between the third voltage and the third level.

20. A method of signal transmission in a communication system, comprising:
transmitting an optical beam through a modulator adapted to:
have a peak of light transmission at a first voltage;
substantially block light transmission at a second voltage greater than the first voltage; and
have another peak of light transmission at a third voltage greater than the second voltage; and
driving the modulator with an electrical signal having three or more levels, wherein:
a first level is outside of a voltage range between the first and third voltages, said voltage range including the first and third voltages;
a second level is either inside the voltage range between the first and third voltages or outside of said voltage range on the opposite side from the first level;
a third level is inside said voltage range; and
the difference between the first level and the first voltage exceeds 10% of the difference between the first and third voltages.

* * * * *